Dec. 23, 1930. A. D. FERGUSON 1,786,199
VALVE MECHANISM
Original Filed Aug. 11, 1922
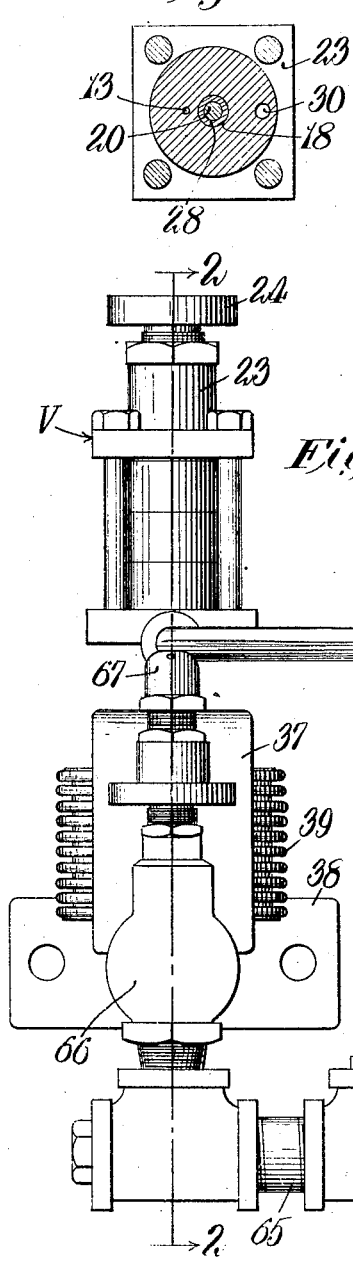
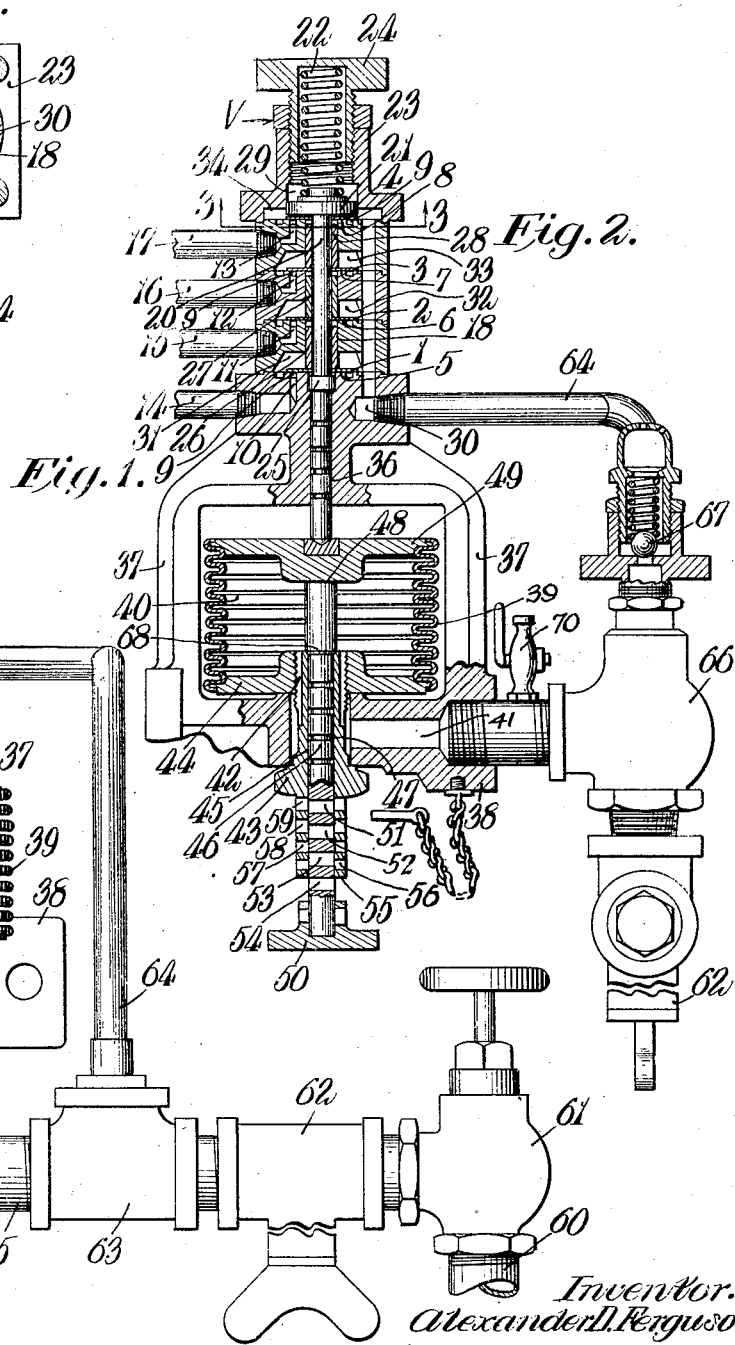
Inventor:
Alexander D. Ferguson
by
Louis A. Maxson
Attorney Patented Dec. 23, 1930

1,786,199

UNITED STATES PATENT OFFICE

ALEXANDER D. FERGUSON, OF MICHIGAN CITY, INDIANA, ASSIGNOR TO SULLIVAN MACHINERY COMPANY, A CORPORATION OF MASSACHUSETTS

VALVE MECHANISM

Original application filed August 11, 1922, Serial No. 581,253. Divided and this application filed March 26, 1926. Serial No. 97,711.

This invention relates to valve mechanisms and more particularly to pilot valve mechanisms adapted to effect sequential control of a plurality of fluid pressure governed devices.

A particular field for the invention is found in the control of unloading mechanisms of the "step by step" type, in which it is adapted to effect the progressive unloading of a plural unit compressor device in such manner that the latter may be driven steadily at constant speed and its output varied in such manner as to maintain discharge line pressure substantially constant notwithstanding widely varying demands for the compressed fluid.

An object of my invention is to provide an improved controlling valve mechanism. Another object of my invention is to provide an improved controlling valve mechanism governed by pressure variations. A further object of my invention is to provide an improved controlling valve mechanism adapted to the sequential control of a plurality of fluid pressure controlled devices. A still further object of my invention is to provide an improved controlling valve mechanism embodying improved means whereby automatic and manual control mechanisms may cooperate in such manner that automatic control may be maintained unaffected in the range of operation not deliberately manually controlled. Other objects and advantages of my invention will hereinafter more fully appear.

This application is a division of my application filed on August 11, 1922, Serial No. 581,253 which has become Patent No. 1,649,299, dated November 15, 1927.

In the accompanying drawings, in which I have shown for purposes of illustration one form which my invention may assume in practice, Fig. 1 is a side elevation of a control mechanism constructed in accordance with the illustrative embodiment of the invention.

Fig. 2 is a section on the plane of the line 2—2 of Fig. 1.

Fig. 3 is a transverse section on the line 3—3 of Fig. 2.

Referring to the drawings the valve mechanism is generally designated V and noting first the control exercising portions of this mechanism, it may be observed that a series of thin annular valve members 1, 2, 3 and 4 are provided. The valve members 1 to 4 respectively are arranged to cooperate with seats 5, 6, 7 and 8, the several seats being plane and each containing an annular groove 9, the several annular grooves 9 communicating respectively by passages respectively numbered 10, 11, 12 and 13 with pipes 14, 15, 16 and 17 which may conduct operating fluid to the mechanisms which it is desired to control. Each of the seats 5, 6, 7 and 8 inclusive is traversed by a central passageway, these passageways being of uniform diameter and being indicated by 18. Extending longitudinally through the several passageways mentioned is a stem 20 formed at its top with a plunger or piston 21 upon which a spring 22, housed in the casing 23 and adjustable by means of a follower 24, acts. Formed upon the stem 20 is a collar 25 which is adapted to engage after a predetermined movement from a given lower position which will later be more fully described, the valve mechanism 1 and lift it from its seat 5. Resting upon the top of the valve mechanism 1 is a sleeve or pusher member 26 which is of slightly less length than the distance between the valve mechanism 1 and the valve mechanism 2 when both are seated. This sleeve is adapted to be raised on upward movement of the valve 1 and after sufficient upward movement to engage and lift the valve member 2. A similar sleeve or pusher member cooperating with the valve 3 in a similar manner and designated 27 is superimposed on the valve 2 and a further similar sleeve or pusher member 28 is arranged to be lifted by the valve member 3 and to raise the valve member 4. The piston 21 is slidable in a cylinder 29 formed in the casing 23 and fluid pressure from a suitable source is conducted by a passage 30 to chambers 31, 32, 33 and 34 in which the valve members 1 to 4 respectively are located. This pressure normally tends, of course, to maintain the several valve members seated however, it will be observed that the valve members are raised successively from their seats and it will further be observed that the valve members are all of substantially equal diameter with the piston 21, and therefore it will be apparent that the pressure of air acting beneath the piston 21 is such as to practically neutralize the work necessary in raising one of the valve members off its seat. The stem 20 passes through a suitable bore 36 downward into a space formed between a pair of support members 37 formed integral with the support 38. Secured to the support 38 is an expansible diaphragm chamber 39 to whose interior 40 fluid may be conducted by a passage 41 and a series of grooves 42 formed in the member 43 which threadedly engages the lower head 44 of the diaphragm chamber and holds it fixedly in position on the member 38. The member 43 is traversed by a passage 45 through which a plunger 46 alined with the stem 20 and having suitable sealing grooves 47 snugly extends, the plunger 46 engaging at 48 the upper head 49 of the diaphragm chamber. The plunger 46 is provided at its lower end with a handle 50 and is provided with a series of four parallel passageways 51, 52, 53 and 54. The member 43 is provided with a depending sleeve 55 in which a series of holes 56, 57, 58 and 59 are formed, these holes being so spaced relative to each other and to the holes 51 to 54 that the hole 51 will register with the hole 59 with a very slight upward movement of the stem 46 while progressively further upward movements of the stem 46 will successively cause registration of the holes 52 and 58, 53 and 57, and 54 and 56. When the first of these pairs of holes register, valve 1 is unseated and as each successive pair of holes is brought into register, an additional valve is opened. The function of this mechanism will shortly be explained.

Leading from a suitable source of pressure by which it is desired to effect control is a passage or connection 60 controlled by a stop valve 61 and provided with a strainer 62 to prevent the passage of impurities or solid matter to the valve mechanism. Beyond the strainer 62 is a T 63 from which a connection 64 leads to the passageway 30 previously described. From the other end of the T a connection 65 leads to a pop valve 66. Valve 66 works on the principle of the ordinary safety valve, that is, it opens when a desired pressure is reached in the line 60 and permits a pressure equal to the excess above the desired pressure in line 60 to pass through the valve before it again closes. The chamber above the valve in the pop valve 66 communicates with the passage 41 so that a pressure equal to the excess above the setting of the pop valve will be transmitted to the diaphragm chamber 40. Upon the top of the pop valve 66 is a safety valve 67 loaded to prevent building up of more than a desired pressure in the diaphragm chamber 40. A suitable pin hole leak or adjustable leak 70 as may be desired is arranged at any suitable point between the pop valve 66 and the limits of the diaphragm chamber whereby the pressure in the chamber 40 will promptly fall on closure of the pop valve 66. Leakage may be also permitted around the plunger 46, a shoulder 68 thereon then cooperating with the top of the member 43 in preventing leakage when the diaphragm is collapsed to its smallest size.

Let it be assumed that the control pressure rises to a degree above that which is desired. As a result the pop valve 66 which is set to open when the pressure exceeds the desired pressure will open and pressure fluid will be transmitted into the diaphragm chamber 40. If the pressure rises to a value say two or three pounds in excess of the desired pressure, the expansion of the diaphragm chamber will cause the collar 25 to raise the valve 1 and pressure will be supplied to the line 14. As a result air will be supplied to effect operation of the fluid controlled apparatus governed by the admission of pressure to the line 14. In case the controlling pressure continues to rise, the pressure passing the pop valve 66 will reach a value a few pounds higher than is necessary to open valve 1, and valve 2 will then be raised by continued upward movement of the valve 1 causing sleeve 18 to lift valve 2. Pressure will then be transmitted through pipe 15 to the mechanism controlled thereby. Similar operations will take place with regard to valves 3 and 4 as the controlling pressure continues to rise.

At this point it may be well to note that if the lines 14, 15, 16 and 17 be connected to independent unloading mechanisms for respectively controlling the discharge of pressure to a common line with which the line 60 communicates, the pilot valve mechanism described will function to control the number of loaded compressor units in a manner to maintain substantially constant pressure limits with widely varying air demands.

In case it be desired to maintain in its condition resulting from the control by fluid pressure admitted through the line 14 the device governed by pressure so transmitted, the handle 50 may be forced upward and by the insertion of a suitable pin through the holes 51 and 59 the desired function will be accomplished. Obviously by inserting the pin in other pairs of mating holes, like results can be accomplished in respect to the other control devices. It will be evident, however, that the valves not positively held open will be governed at the same critical pressures that would be effective in the event that the manual control through the handle 50 were entirely eliminated.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a source of pressure fluid provided with a pop valve, a plurality of coaxially disposed valve seats in common communication with said source, a separate discharge passage leading from each of said valve seats, a plurality of coaxially disposed valves cooperating with said seats to control flow of pressure fluid to said passages, and operating means for said several valves adapted to serially open the same including a pressure fluid motor actuated by fluid delivered from said source through said pop valve.

2. In a valve mechanism, a plurality of valves of the unbalanced type, means for serially operating said valves, said means opening one valve at a time, independent discharge passages each of which is controlled by one of said valves, said valves being opened against fluid pressure and all of said valves having the same effective area subject to fluid pressure resisting opening, and fluid pressure means tending to counterbalance said pressure during opening of said valves, said means being subject to the same fluid pressure as tends to seat said valves.

3. In a valve mechanism, a plurality of valves of the unbalanced type, means for serially operating said valves, said means opening one valve at a time, independent discharge passages each of which is controlled by one of said valves, said valves being opened against fluid pressure and all of said valves having the same effective area subject to fluid pressure resisting opening, and means common to all of said valves tending to counterbalance said pressure during opening of said valves, said means being subject to the same fluid pressure as tends to seat said valves.

4. A valve mechanism comprising serially operated valves of which a plurality are adapted to be seated simultaneously during existence of fluid pressure thereon, a separate passage being controlled by each of said valves, each passage communicating with a source of live fluid pressure when the controlling valve therefor is open, automatic actuation mechanism normally controlling said valves, and manual means common to a plurality of said valves for selectively holding one or more of said valves open while the remainder continue under the control of said automatic actuation mechanism.

5. A valve mechanism comprising a plurality of valves, automatic actuation mechanism for serially opening the same, a separate passage controlled by each of said valves, each of said passages communicating with a source of live fluid pressure when the controlling valves therefor are open, and manual means common to a plurality of said valves and supplemental to said automatic actuation mechanism for selectively holding one or more of said valves open while the remainder continue under the control of said automatic actuation mechanism.

6. A valve mechanism comprising a plurality of coaxially disposed relatively movable valves, power operated means for serially actuating the same, a separate passage controlled by each of said valves, each of said passages communicating with a source of live fluid pressure when the control valve therefor is open, and manual means common to a plurality of said valves for selectively actuating and holding one or more of the same open while permitting the remainder of said valves to be actuated by said power means.

7. A valve mechanism comprising a plurality of coaxially disposed valves, means for actuating the same and adapted to hold any number thereof open, said means comprising cooperating members having registering means, and means adapted to cooperate therewith to hold said valves open.

8. A valve mechanism comprising a plurality of serially operated coaxially disposed valves, manual means for actuating the same, and means for controlling said actuating means comprising cooperating elements having registering means.

9. A valve mechanism comprising a plurality of coaxially disposed valves, coaxial means for serially operating the same, and actuating means for said operating means comprising a fluid operated member and a stem projecting axially therethrough adapted to be manually operated, and means permitting fluid flow to said fluid means through the axial portion adjacent said axially extending member.

10. In a pilot mechanism, a plurality of serially movable controlling elements, means for actuating said elements including a member adapted upon different degrees of movement thereof to operate one or more of said elements to effect their controlling functions, means automatically responsive to different degrees of fluid pressure for operating said member, and manual means for moving said member to selectively operate one or more of said elements without interfering with operation of the remainder of said elements through said member by said automatic means.

11. In a valve mechanism, a plurality of coaxially disposed valve seats, a series of coaxially disposed valves cooperating with said seats, an element extending through said valves for maintaining the same in alinement with each other, pusher members of less thickness than the distance between adjacent valves slidable on said alining element and adapted also to be movable relative to said valves, there being disposed between any two adjacent valves a pusher member, the same contacting with both valves when both valves are lifted off their seats, and means for lifting the first of said series of valves.

12. In a valve mechanism, a plurality of serially operated valves, independent discharge passages each of which is controlled by one of said valves, said valves being opened against fluid pressure and each presenting the same effective area to said fluid pressure, and means common to all of said valves tending to counterbalance said pressure during opening of said valves, said means having a movable wall of effective area equal to the effective area presented to pressure tending to seat one of said valves and subject to the same fluid pressure as tends to seat said valves.

13. In a valve mechanism, a plurality of serially operated valves, independent passages each of which is controlled by one of said valves, said valves being opened against fluid pressure and each presenting the same effective area to said fluid pressure, and a cylinder and piston common to all of said valve tending to counterbalance said pressure during opening of said valves, the effective area of said piston being equal to the effective area presented to pressure tending to seat one of said valves and subject to the same fluid pressure as tends to seat said valves.

In testimony whereof I affix my signature.

ALEXANDER D. FERGUSON.